United States Patent
Okuyama

(10) Patent No.: US 9,106,331 B2
(45) Date of Patent: Aug. 11, 2015

(54) TRANSMISSION APPARATUS AND PROCESSING METHOD THEREOF

(75) Inventor: Keiichi Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 14/118,463

(22) PCT Filed: Apr. 25, 2012

(86) PCT No.: PCT/JP2012/061076
§ 371 (c)(1),
(2), (4) Date: Nov. 18, 2013

(87) PCT Pub. No.: WO2012/160932
PCT Pub. Date: Nov. 29, 2012

(65) Prior Publication Data
US 2014/0086572 A1    Mar. 27, 2014

(30) Foreign Application Priority Data
May 20, 2011  (JP) ................. 2011-113222

(51) Int. Cl.
*H04B 10/03*    (2013.01)
*H04B 1/74*    (2006.01)
(Continued)

(52) U.S. Cl.
CPC ............ *H04B 10/03* (2013.01); *H04B 1/74* (2013.01); *H04B 10/801* (2013.01);
(Continued)

(58) Field of Classification Search
CPC ........ H04B 10/03; H04B 10/801; H04B 1/74; H04L 12/6418; H04Q 11/04; H04J 2203/0026; H04J 3/1611; H04J 3/1623
USPC .................................. 398/115–117
See application file for complete search history.

(56) References Cited

U.S. PATENT DOCUMENTS 7,873,053 B2 *  1/2011  Papadimitriou ........... 370/395.3
2002/0075542 A1  6/2002  Kumar et al.
(Continued)

FOREIGN PATENT DOCUMENTS

AU  2004214585  4/2005
CN  1606365  4/2005
(Continued)

OTHER PUBLICATIONS

Office Action issued by the State Intellectual Property Office of China for Chinese Patent Application No. 201280024491.2 mailed Oct. 21, 2014 (10 pgs.).
(Continued)

*Primary Examiner* — Leslie Pascal
(74) *Attorney, Agent, or Firm* — Wilmer Cutler Pickering Hale and Dorr LLP

(57) ABSTRACT

A transmission apparatus includes a package that has a plurality of slots into each of which a board can be freely detachably inserted; at least one control board; a PWE interface communication unit that is connected to the control board, converts an input SDH or PDH signal to a packet signal, and outputs the converted signal to the control board; a radio transmission communication unit that is connected to the control board, converts the packet signal to a radio signal, and outputs the converted signal; and an optical transmission communication unit that is connected to the control board, converts the packet signal to an optical transmission signal, and outputs the converted signal. The units are separately inserted in the slots.

8 Claims, 7 Drawing Sheets

(51) Int. Cl.
*H04B 10/80* (2013.01)
*H04L 12/64* (2006.01)
*H04Q 11/04* (2006.01)
*H04J 3/16* (2006.01)

(52) U.S. Cl.
CPC .......... *H04L 12/6418* (2013.01); *H04Q 11/04* (2013.01); *H04J 3/1611* (2013.01); *H04J 3/1623* (2013.01); *H04J 2203/0026* (2013.01)

(56) References Cited

U.S. PATENT DOCUMENTS

| | | |
|---|---|---|
| 2002/0122231 A1 | 9/2002 | Verbana et al. |
| 2005/0078618 A1 | 4/2005 | Woo et al. |
| 2008/0130689 A1 | 6/2008 | Kumar et al. |
| 2008/0259901 A1 | 10/2008 | Friedman et al. |

FOREIGN PATENT DOCUMENTS

| | | |
|---|---|---|
| CN | 1988490 A | 6/2007 |
| CN | 101542985 A | 9/2009 |
| CN | 101843070 A | 9/2010 |
| CN | 101542985 B | 3/2011 |
| CN | 102257771 A | 11/2011 |
| EP | 1237303 A2 | 9/2002 |
| EP | 1523201 | 4/2005 |
| EP | 1983668 A2 | 10/2008 |
| JP | 10-164636 | 6/1998 |
| JP | 2001-057527 | 2/2001 |
| JP | 2005-117663 | 4/2005 |
| JP | 2011-057527 A | 3/2011 |
| JP | 4740241 | 8/2011 |
| WO | WO-93/20643 A1 | 10/1993 |
| WO | WO-2007/007662 | 1/2007 |

OTHER PUBLICATIONS

International Search Report corresponding to PCT/JP2012/061076, dated May 25, 2012, 4 pages.

European Search Report corresponding to European Patent Application No. 12788951.7, dated Jan. 28, 2015, 7 pages.

Russian Office Action issued in corresponding Russian Application No. 2013154580/07(085237), mailed Feb. 9, 2015, 7 pages.

* cited by examiner

TRANSMISSION APPARATUS AND PROCESSING METHOD THEREOF

TECHNICAL FIELD

The present invention relates to a transmission apparatus that relays a communication signal, and a processing method thereof.

This application is a national stage application of International Application No. PCT/JP2012/061076 entitled "Transmission Apparatus and Processing Method Thereof," filed on Apr. 25, 2012, which claims priority to Japanese Patent Application No. 2011-100971, filed on May 20, 2011, the disclosures of each of which are hereby incorporated by reference in their entirety.

BACKGROUND ART

Regarding characteristics of radio transmission that utilizes spatial propagation, transmission performance may vary due to environmental conditions about weather, obstruction, or the like. Therefore, when the weather condition is bad, the radio transmission should be operated within a restricted frequency band.

On the other hand, since optical transmission utilizes an optical fiber as a transmission medium, it has a risk such that the optical fiber may be broken off due to an earthquake, a fire, road work, or the like. Therefore, if an optical fiber for optical transmission is broken off due to an earthquake or the like, a detour should be established so as not to use the broken line, and the broken optical fiber should be restored.

A technique relating to the present invention is shown in Patent-Document 1.

PRIOR ART DOCUMENT

Patent Document

Patent Document 1: Japanese Unexamined Patent Application, First Publication No. 2001-057527.

DISCLOSURE OF INVENTION

Problem to be Solved by the Invention

Recently, a technique for the transmission apparatus is desired in which communication by optical transmission and communication utilizing radio signals can be appropriately switched with each other in accordance with communication statuses thereof, and such a function enhancement can be easily performed in an existing transmission apparatus.

Therefore, the present invention has an object to provide a transmission apparatus and a processing method thereof, which can achieve the object.

Means for Solving the Problem

In order to achieve the above object, the present invention provides a transmission apparatus comprising:

a package that has a plurality of slots into each of which a board can be freely detachably inserted;

at least one control board;

a PWE (Pseudo Wire Emulation) interface communication unit that is connected to the control board, converts an input SDH (Synchronous Digital Hierarchy) or PDH (Pre Synchronous Digital Hierarchy) signal to a packet signal, and outputs the converted signal to the control board;

a radio transmission communication unit that is connected to the control board, converts the packet signal to a radio signal, and outputs the converted signal; and an optical transmission communication unit that is connected to the control board, converts the packet signal to an optical transmission signal, and outputs the converted signal, wherein the units are separately inserted in the slots.

In the above structure, it is possible to further comprise an SDH/PDH signal communication unit that is further separately inserted in the slots so as to be connected to the control board and outputs the input SDH or PDH signal to the control board, wherein the PWE interface communication unit receives the SDH or PDH signal output via the SDH/PDH signal communication unit and the control board, converts the received signal to the packet signal, and outputs the converted signal.

The present invention also provides a processing method of a transmission apparatus which includes a package that has a plurality of slots into each of which a board can be freely detachably inserted; and at least one control board, where a PWE interface communication unit, a radio transmission communication unit, and an optical transmission communication unit are each connected to the control board and are separately inserted in the slots, wherein in the method:

the PWE interface communication unit converts an input SDH or PDH signal to a packet signal, and outputs the converted signal to the control board;

the radio transmission communication unit converts the packet signal to a radio signal, and outputs the converted signal; and the optical transmission communication unit converts the packet signal to an optical transmission signal, and outputs the converted signal.

In the above method, it is possible that:

an SDH/PDH signal communication unit that is further separately inserted in the slots so as to be connected to the control board and outputs the input SDH or PDH signal to the control board; and the PWE interface communication unit receives the SDH or PDH signal output via the SDH/PDH signal communication unit and the control board, converts the received signal to the packet signal, and outputs the converted signal.

Effect of the Invention

In accordance with the present invention, for a transmission apparatus in which a communication unit that converts an SDH/PDH signal to a packet signal by means of a Pseudo-Wire technique is inserted into a slot of the apparatus so that the control board only possesses a packet switch, it is possible for the transmission apparatus to convert a signal for the SDH/PDH signal into a radio signal or an optical transmission signal and to output the converted signal to an appropriate device.

Additionally, in accordance with the present invention, a redundant arrangement is applied to each input signal so that the output route can be appropriately chosen between one that utilizes a radio signal and one that utilizes an optical transmission signal. Therefore, a highly reliable transfer can be performed in the relevant communication even when a change in the environment or a serious disaster occurs.

That is, if the frequency band for radio transmission should be restricted due to environmental degradation, such restriction can be compensated utilizing optical transmission. On the other hand, if an optical fiber is broken off due to a serious disaster or the like, the relevant transmission path can be secured utilizing radio transmission.

MODE FOR CARRYING OUT THE INVENTION

Below, an embodiment of the present invention will be explained in detail with reference to the drawings.

Figure 1:
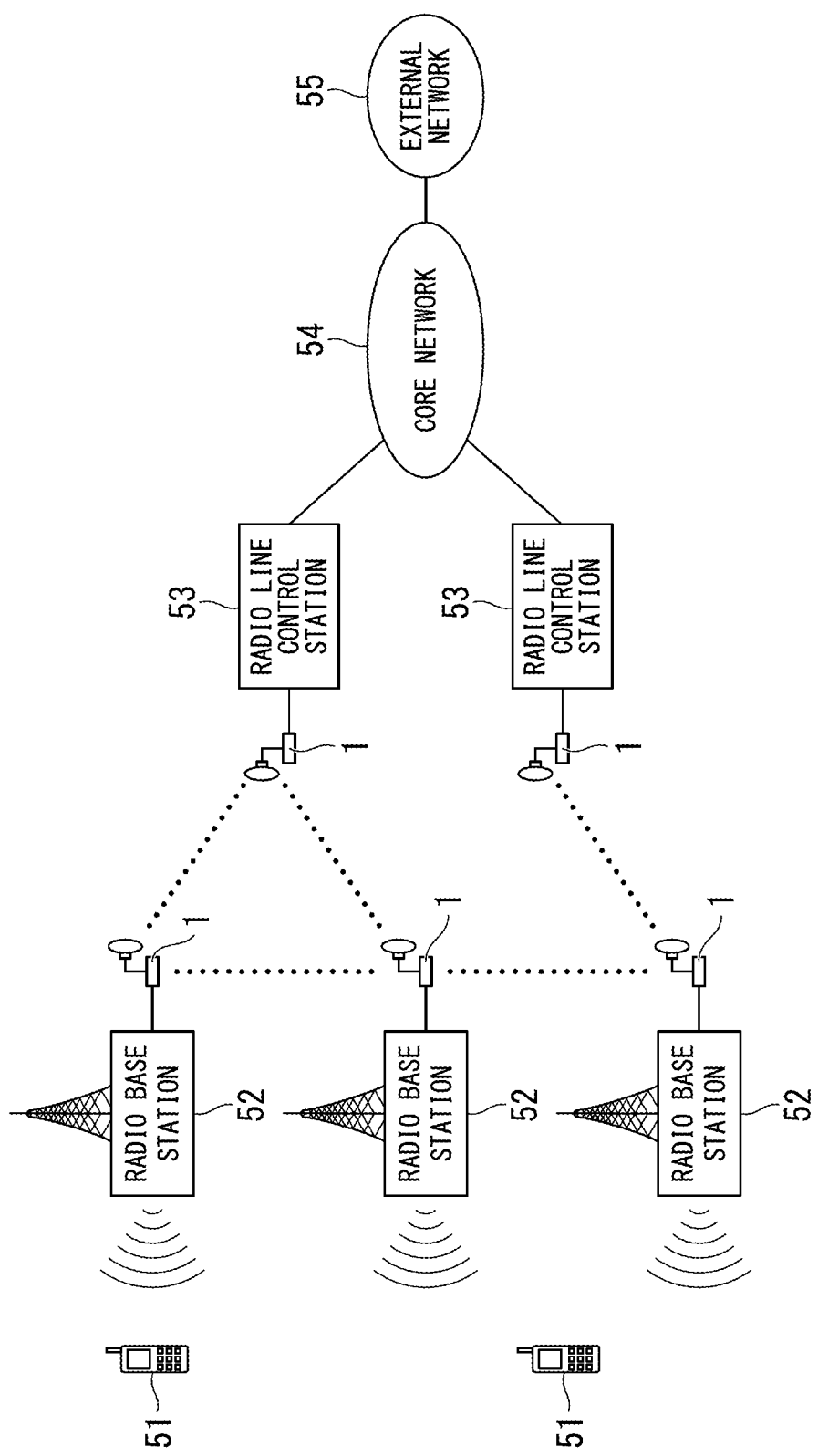
FIG. 1 is a diagram showing the structure of a communication network to which a transmission apparatus in accordance with an embodiment of the present invention is applied.

FIG. 1 is a diagram showing the structure of a communication network 50 to which a transmission apparatus 2 (see FIG. 2) in accordance with the present embodiment is applied.

The communication network 50 has radio terminals 51 such as cellular phones, radio base stations 52, radio line control stations 53, a core network 54, and an external network 55.

Each radio terminal 51 can perform communication within a range which can receive radio waves from any radio base station 52.

Each radio base station 52 is connected to a radio line control station 53 as an upper station, and the radio line control station 53 controls a plurality of the radio base stations 52.

In addition, each radio line control station 53 is connected to the core network 54.

The core network 54 is connected to the external network 55 (e.g., a mobile communication network operated by another communication carrier or a public line network).

A radio communication apparatus 1 is provided at each of the radio base stations 52 and the radio line control stations 53, and communication between two radio base stations 52 or between a radio base station 52 and a radio line control station 53 is performed via radio waves.

The radio communication apparatus 1 is a communication apparatus that utilizes microwaves to perform high-speed radio communication, and the radio communication apparatus 1 includes an outdoor device such as an antenna utilized for radio wave transmission and reception, and an indoor apparatus such as a transmission apparatus 2 that processes received waves.

Figure 2:
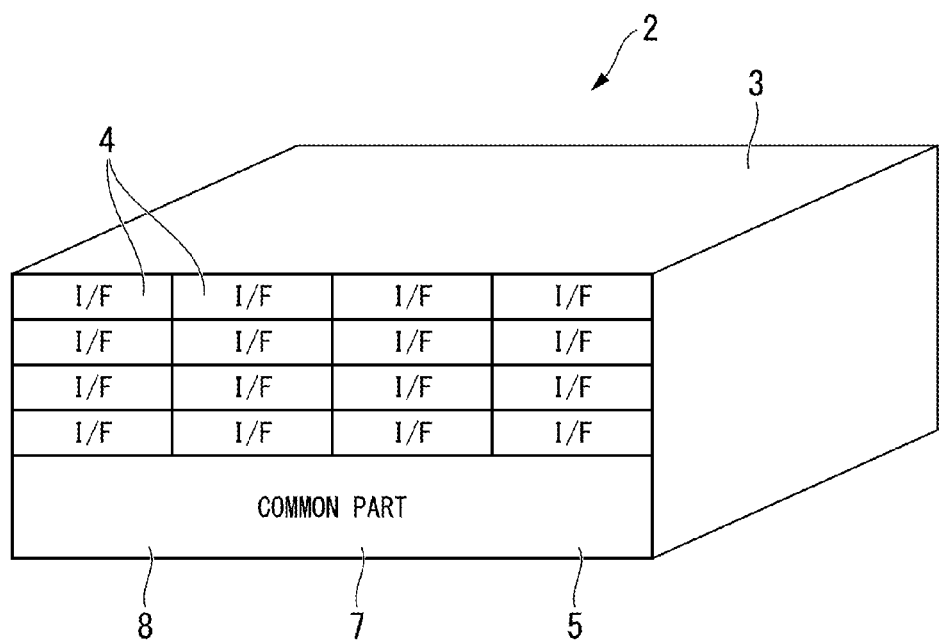
FIG. 2 is a general external view of the transmission apparatus in the embodiment.

FIG. 2 is a general external view of the transmission apparatus 2.

The transmission apparatus 2 as a functional constituent of the radio communication apparatus 1 has a package 3 having a rectangular shape, communication units 4 (each shown as "I/F" in FIG. 2) built in the package 3, a control board 5, an (electric) power unit 7, and an external device connecting board 8.

The communication units 4, the control board 5, the power unit 7, and the external device connecting board 8 are connected to each other via a mother board 9 (see FIG. 3 that will be explained later) arranged on the back surface side of the package 3 (i.e., the side opposite to the opening side thereof).

The package 3 has a package main body having a box shape whose front face has an opening. On both lateral sides of the package main body 10, a plurality of ventilation holes are formed. Hereinbelow, a direction perpendicular to a face that includes the above-described opening is called a "depth direction", and a horizontal direction perpendicular to the depth direction is called a "cross direction".

In the present embodiment, when viewing from the opening side of the package 3, the internal space of the package 3 has (i) four sections divided in the cross direction, and (ii) six steps divided in the vertical direction, where the fifth and sixth steps form a common region, and the upper four steps function as a plurality of slots, into each of which a board can be freely detachably inserted.

Here, the internal space of the package 3 may have any number of sections divided in the cross direction, and any number of steps divided in the vertical direction when viewing from the opening side of the package 3.

On the mother board 9, a plurality of connectors to which the communication units 4, the control board 5, the power unit 7, and the external device connecting board 8 can be connected are provided at positions corresponding to the units and boards to be connected.

Below, connection arrangement of the structural components of the transmission apparatus 2 and details of the respective structural components will be explained.

Figure 3:
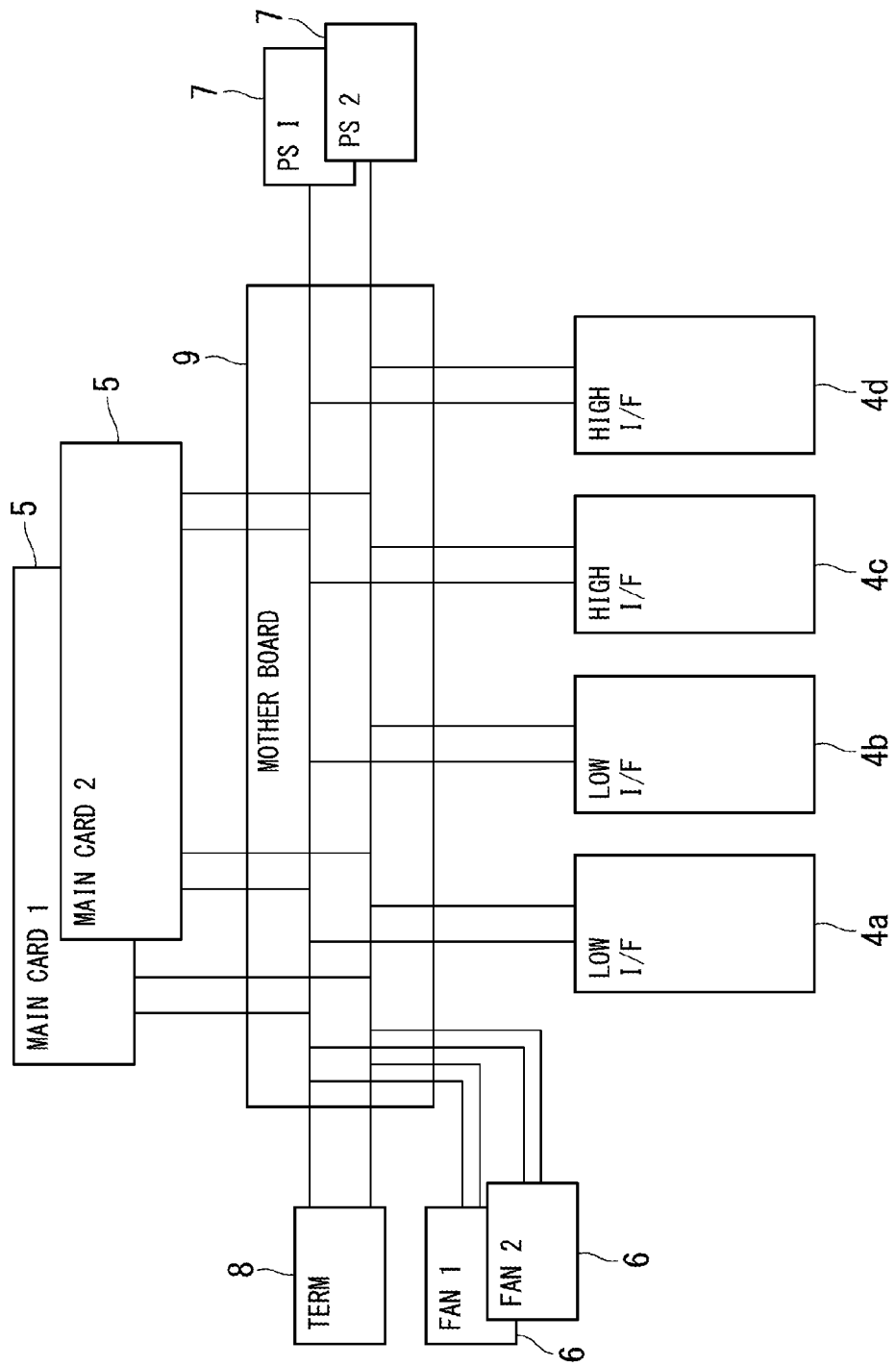
FIG. 3 is a diagram that shows connection arrangement of the structural components of the transmission apparatus in the embodiment.

As shown in FIG. 3, communication units 4a to 4d (collectively called as the above-described communication units 4), the control boards 5, fan units 6, the power units 7, and the external device connecting board 8 are connected via the mother board 9.

Here, the transmission apparatus 2 has two control boards 5, two fan units 6, and two power units 7, and a plurality of communication units 4 can also be connected.

The two power units 7 (indicated by "PS 1" and "PS 2" in FIG. 3) have the same structure, and supply power via the mother board 9 to the control boards 5, fan units 6, and the external device connecting board 8, where electric power required by the transmission apparatus 2 can be supplied by one power unit 7.

That is, even when one of the two power units 7 is not operated (in failure), the transmission apparatus 2 can be operated.

In normal settings, the two power units 7 are operated in parallel so that they share required power to be supplied. If one of them has broken down, the other power unit 7 that can operate normally supplies the entire power. In addition, the power unit 7 in failure can be replaced with a normal unit without stopping the operation of the radio communication apparatus 1.

The two control boards 5 (indicated by "MAIN CARD 1" and "MAIN CARD 2" in FIG. 3) also have the same structure, and each of them generally controls the respective structural components of the transmission apparatus 2. That is, even when one of the control boards 5 is not operated, the transmission apparatus 2 can be operated. In addition, the control board 5 in failure can be replaced with a normal board without stopping the operation of the radio communication apparatus 1.

The two fan units 6 (indicated by "FAN 1" and "FAN 2" in FIG. 3) also have the same structure, and each of them has two fans so as to exhaust air within the package 3 as described above. In normal settings, the two fan units 6, that is, the four fans are operated. If one of the fan units 6 has broken down, wind power of the remaining fan unit 6 is increased.

As an example, the communication units 4 to be connected may be an SDH (Synchronous Digital Hierarchy)/PDH (Pre Synchronous Digital Hierarchy) signal communication unit 4a (indicated by "LOW I/F" in FIG. 3), a packet signal communication unit 4b (indicated by "LOW I/F" in FIG. 3), a radio transmission communication unit 4c (indicated by "HIGH I/F" in FIG. 3), and an optical transmission communication unit 4d (indicated by "HIGH I/F" in FIG. 3).

The control boards 5 each can perform signal control of the SDH/PDH signal communication unit 4a, the packet signal communication unit 4b, the radio transmission communication unit 4c, and the optical transmission communication unit 4d.

The external device connecting board 8 (indicated by "TERM" in FIG. 3) is a board utilized for connecting the control boards 5 with an external device such as a personal computer. Although it is not shown, on a front panel of the external device connecting board 8, a connector utilized for executing the communication is provided. Additionally, the external device connecting board 8 can be connected to either of the two control boards 5.

Figure 4:
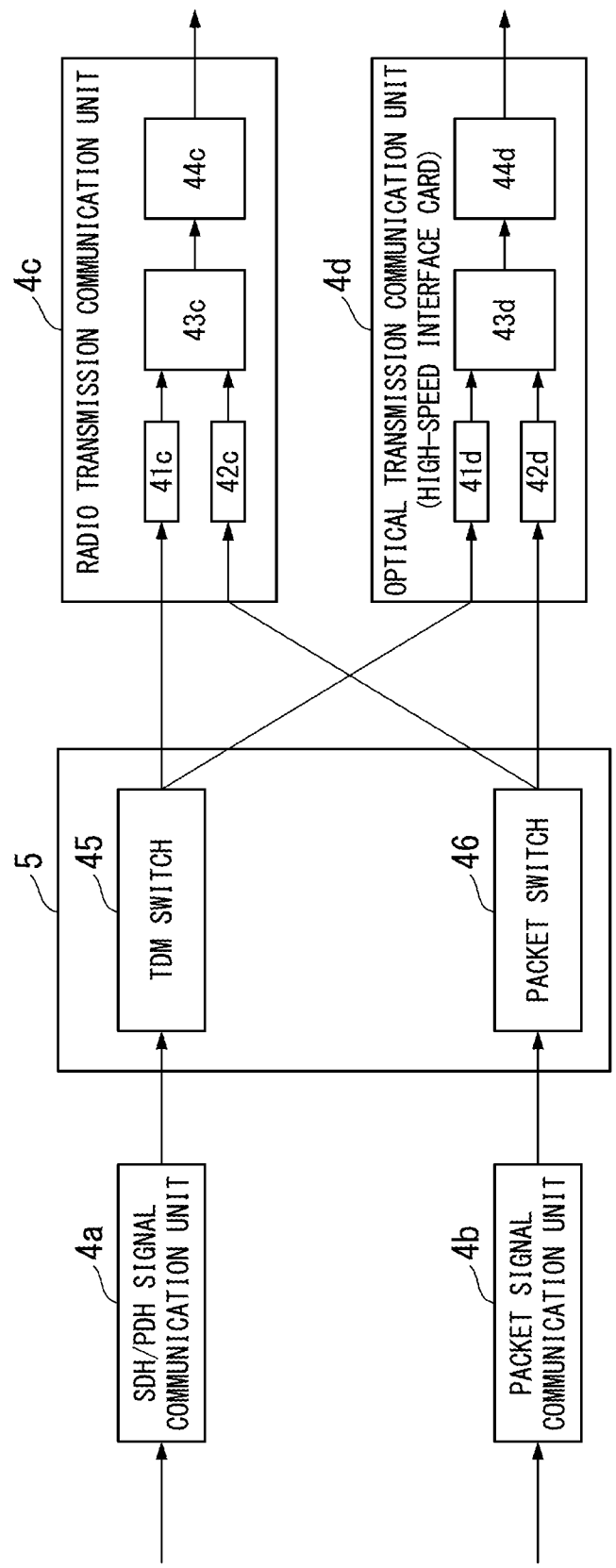
FIG. 4 is a first diagram that shows a main signal connection configuration between a control board and communication units.

FIG. 4 is a first diagram that shows a main signal connection configuration between one control board 5 and the communication units 4.

First, the main signal connection configuration between the control board 5, the SDH/PDH signal communication unit 4a, the packet signal communication unit 4b, the radio transmission communication unit 4c, and the optical transmission communication unit 4d will be explained.

As shown in FIG. 4, the SDH/PDH signal communication unit 4a, the packet signal communication unit 4b, the radio transmission communication unit 4c, and the optical transmission communication unit 4d are connected to the control board 5 via the mother board 9 (not shown in FIG. 4).

On the control board 5, a TDM (Time Division Multiplex) switch 45 that performs a transfer process of TDM data and a packet switch 46 that performs a transfer process of packet communication data are provided.

The SDH/PDH signal communication unit 4a is connected via the mother board 9 to the TDM switch 45 of the control board 5. Here, the SDH/PDH signal communication unit 4a is connected via the mother board 9 to the packet switch 46 of the control board 5.

The packet signal communication unit 4b is connected via the mother board 9 to the packet switch 46 of the control board 5. Here, the packet signal communication unit 4b is connected via the mother board 9 to the TDM switch 45 of the control board 5.

The radio transmission communication unit 4c is connected via the mother board 9 to the TDM switch 45 of the control board 5, and simultaneously connected via the mother board 9 to the packet switch 46 of the control board 5.

Similarly, the optical transmission communication unit 4d (high-speed interface card) is connected via the mother board 9 to the packet switch 46 of the control board 5, and simultaneously connected via the mother board 9 to the TDM switch 45 of the control board 5.

In the transmission apparatus 2 of the present embodiment, the TDM switch 45 of the control board 5 receives an SDH/PDH signal as a client signal, and the packet switch 46 of the control board 5 receives a packet signal (e.g., an Ethernet (registered trademark) signal) as a client signal.

The TDM switch 45 or the packet switch 46 of the control board 5 performs a control to output the received signal to the radio transmission communication unit 4c or the optical transmission communication unit 4d. The radio transmission communication unit 4c outputs the received signal in a form of a radio signal while the optical transmission communication unit 4d outputs the received signal in a form of an optical transmission signal.

In the control board 5 (as a switch card), when the TDM switch 45 receives the SDH/PDH signal from the SDH/PDH signal communication unit 4a, the TDM switch 45 performs route allocation (for each line) by means of switching so that the relevant communication signal is output to the radio transmission communication unit 4c or the optical transmission communication unit 4d.

Similarly, when the packet switch 46 receives the packet signal from the packet signal communication unit 4b, the packet switch 46 performs route allocation (for each flow) by means of switching so that the relevant communication signal is output to the radio transmission communication unit 4c or the optical transmission communication unit 4d.

The radio transmission communication unit 4c (modem card) has a TDM terminal 41c that terminates the communication signal input from the TDM switch 45 and a packet terminal 42c that terminates the communication signal input from the packet switch 46. The radio transmission communication unit 4c performs frame processing in each layer by terminating the input communication signal.

The radio transmission communication unit 4c also includes a multiprocessor 43c that performs multiplex control for each communication signal, and a radio frame converter 44c that converts each communication signal into a radio frame.

The optical transmission communication unit 4d (SDH interface card) has a TDM terminal 41d that terminates the communication signal input from the TDM switch 45 and a packet terminal 42d that terminates the communication signal input from the packet switch 46. The optical transmission communication unit 4d performs frame processing in each layer by terminating the input communication signal.

The optical transmission communication unit 4d also includes a multiprocessor 43d that performs multiplex control for each communication signal, and a high-speed interface 44d that converts each communication signal into an optical transmission frame.

Below, the operation of the transmission apparatus 2, that has the control board 5 and the communication units 4 shown in FIG. 4, will be explained.

When the SDH/PDH signal communication unit 4a receives the SDH/PDH signal as a client signal, it outputs the received signal to the control board 5 (switch card).

Here, the client signal is sent from (i) a base station apparatus in a radio network, (ii) a line exchanger in a fixed line network, (iii) a sending apparatus provided in a user's building for a dedicated line service, or (iv) a data center or a sending apparatus provided in a carrier's building of a communication infrastructure.

When the TDM switch 45 of the control board 5 (switch card) receives the relevant signal, it outputs the received signal to a predetermined destination that is the radio transmission communication unit 4c or the optical transmission communication unit 4d. For example, in order to output the signal as a radio signal to another apparatus as a communication destination, the TDM switch 45 outputs the communication signal to the radio transmission communication unit 4c.

Accordingly, the TDM terminal 41c of the radio transmission communication unit 4c terminates the communication signal input from the TDM switch 45. The multiprocessor 43c performs multiplex control for the communication signal, and the radio frame converter 44c converts the multiplexed communication signal into a radio frame. The radio frame converter 44c outputs the radio frame to a radio communication processor that outputs the relevant radio signal as radio waves via the antenna.

On the other hand, in order to output the signal as an optical transmission signal to another apparatus as a communication destination by means of the route allocation, the TDM switch 45 outputs the communication signal to the optical transmission communication unit 4d. Accordingly, the TDM terminal 41d of the optical transmission communication unit 4d terminates the communication signal input from the TDM switch 45. The multiprocessor 43d performs multiplex control for the communication signal, and the high-speed interface 44d converts the multiplexed communication signal into an optical transmission signal. The high-speed interface 44d outputs the relevant transmission frame to an optical communication processor that outputs the optical transmission signal.

Below, an example in which the packet signal communication unit 4b receives a client signal will be explained.

When receiving a packet signal as the client signal, the packet signal communication unit 4b outputs the received signal to the control board 5 (switch card). When the packet switch 46 of the control board 5 (switch card) receives the relevant signal, it outputs the received signal to a predetermined destination that is the radio transmission communication unit 4c or the optical transmission communication unit 4d.

The route allocation for each flow is performed utilizing a VLAN, MPLS headers, MAC addresses, IP addresses, or the like. For example, in order to output the signal as a radio signal to another apparatus as a communication destination, the packet switch 46 outputs the communication signal to the radio transmission communication unit 4c.

Accordingly, the packet terminal 42c of the radio transmission communication unit 4c terminates the communication signal input from the packet switch 46. The multiprocessor 43c performs multiplex control for the communication signal, and the radio frame converter 44c converts the multiplexed communication signal into a radio frame. The radio frame converter 44c outputs the radio frame to a radio communication processor that outputs the relevant radio signal as radio waves via the antenna.

On the other hand, in order to output the signal as an optical transmission signal to another apparatus as a communication destination by means of the route allocation, the packet switch 46 outputs the communication signal to the optical transmission communication unit 4d. Accordingly, the packet terminal 42d of the optical transmission communication unit 4d terminates the input communication signal. The multiprocessor 43d performs multiplex control for the communication signal, and the high-speed interface 44d converts the multiplexed communication signal into an optical transmission signal. The high-speed interface 44d outputs the relevant transmission frame to an optical communication processor that outputs the optical transmission signal.

Since the multiplexing process of the client signal to be output to a radio transmission path or an optical transmission path has been explained, a demultiplexing process of the client signal from the radio transmission path or the optical transmission path is performed in a reverse manner.

Figure 5:
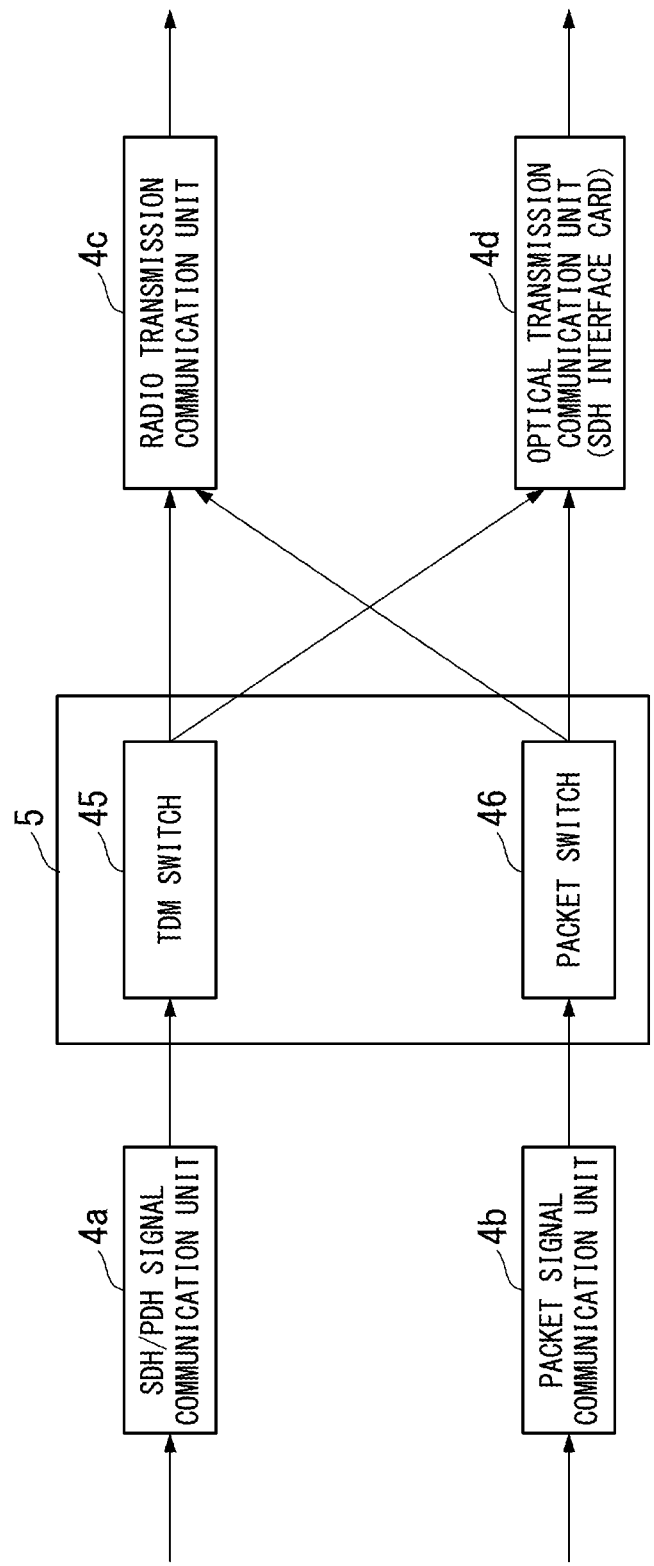
FIG. 5 is a second diagram that shows a main signal connection configuration between a control board and communication units.

FIG. 5 is a second diagram that shows a signal connection configuration between one control board and the communication units.

In the connection configuration of FIG. 5, an SDH interface card is used as the optical transmission communication unit 4d. The SDH interface card is a specific example of the high-speed interface card, and has the same functional blocks as those of the optical transmission communication unit 4d in FIG. 4.

In the SDH interface card, a signal received from the TDM switch 45 is terminated by the TDM terminal 41d, and a signal received from the packet switch 46 is subjected to packet termination and conversion to an SDH frame in the packet terminal 42d. In each termination process, frame processing in each layer may be performed. The conversion process to an SDH frame utilizes a GFP or VCAT technique.

The multiprocessor 43d performs multiplex control for the communication signal, and the high-speed interface 44d outputs the relevant transmission frame to the optical communication processor that outputs the optical transmission signal.

Figure 6:
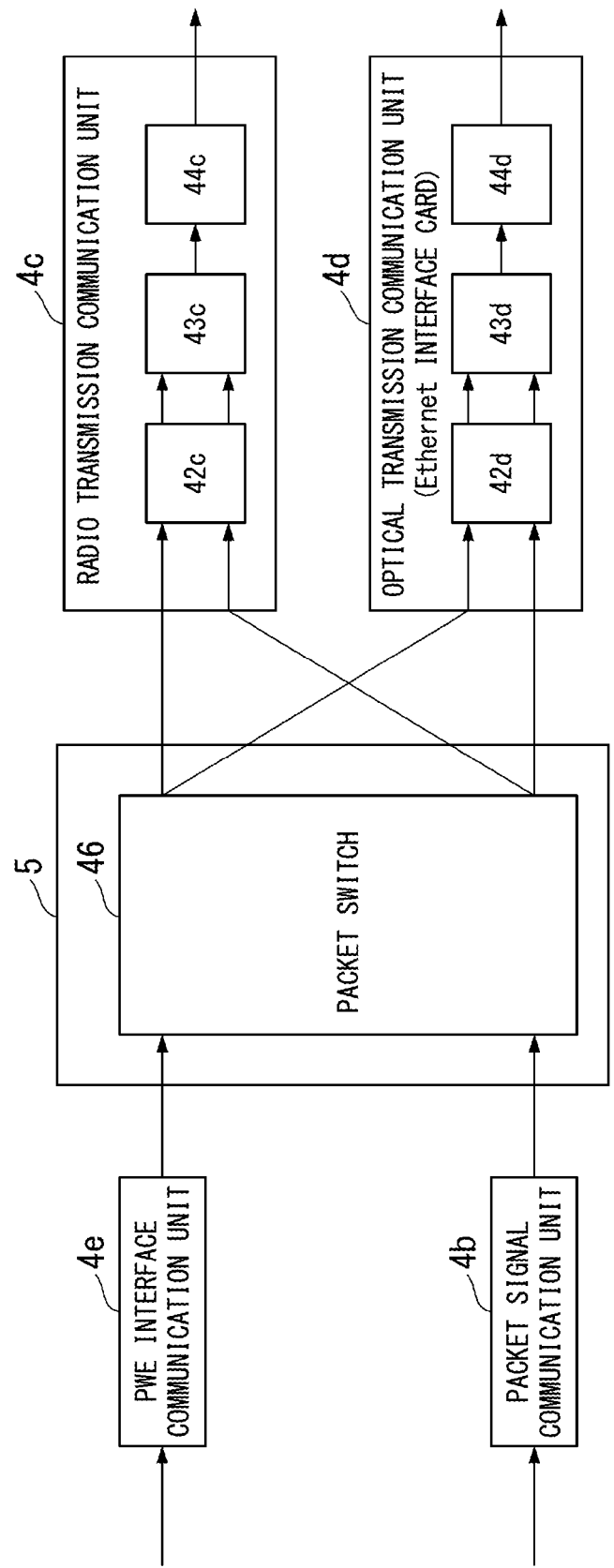
FIG. 6 is a third diagram that shows a main signal connection configuration between a control board and communication units.

FIG. 6 is a third diagram that shows a signal connection configuration between one control board and the communication units.

In the connection configuration of FIG. 6, the SDH/PDH signal communication unit 4a as shown in FIG. 4 is replaced with a PWE (Pseudo Wire Emulation) interface communication unit 4e. The PWE interface communication unit 4e has a function of converting an SDH/PDF signal to a packet signal by means of a Pseudo-Wire technique.

Additionally, in the connection configuration of FIG. 6, an Ethernet (registered trademark) interface card is used as the optical transmission communication unit 4d as shown in FIG. 4.

In addition, the radio transmission communication unit 4c in FIG. 6 includes no TDM terminal 41c, and similarly, the optical transmission communication unit 4d in FIG. 6 includes no TDM terminal 41d.

According to the arrangement of FIG. 6, in the Ethernet (registered trademark) interface card, a signal received from the packet switch 46 is terminated by the packet terminal 42d. The multiprocessor 43d performs multiplex control for the communication signal, and the high-speed interface 44d outputs the relevant transmission frame to the optical communication processor that outputs the optical transmission signal.

On the other hand, when the radio transmission communication unit 4 receives a packet signal output from the PWE interface communication unit 4e via the packet switch 46, the packet signal is terminated by the packet terminal 42c. The multiprocessor 43c performs multiplex control for the communication signal, and the radio frame converter 44c converts the multiplexed communication signal into a radio frame. The radio frame converter 44c outputs the radio frame to the radio communication processor that outputs the relevant radio signal as radio waves via the antenna.

Figure 7:
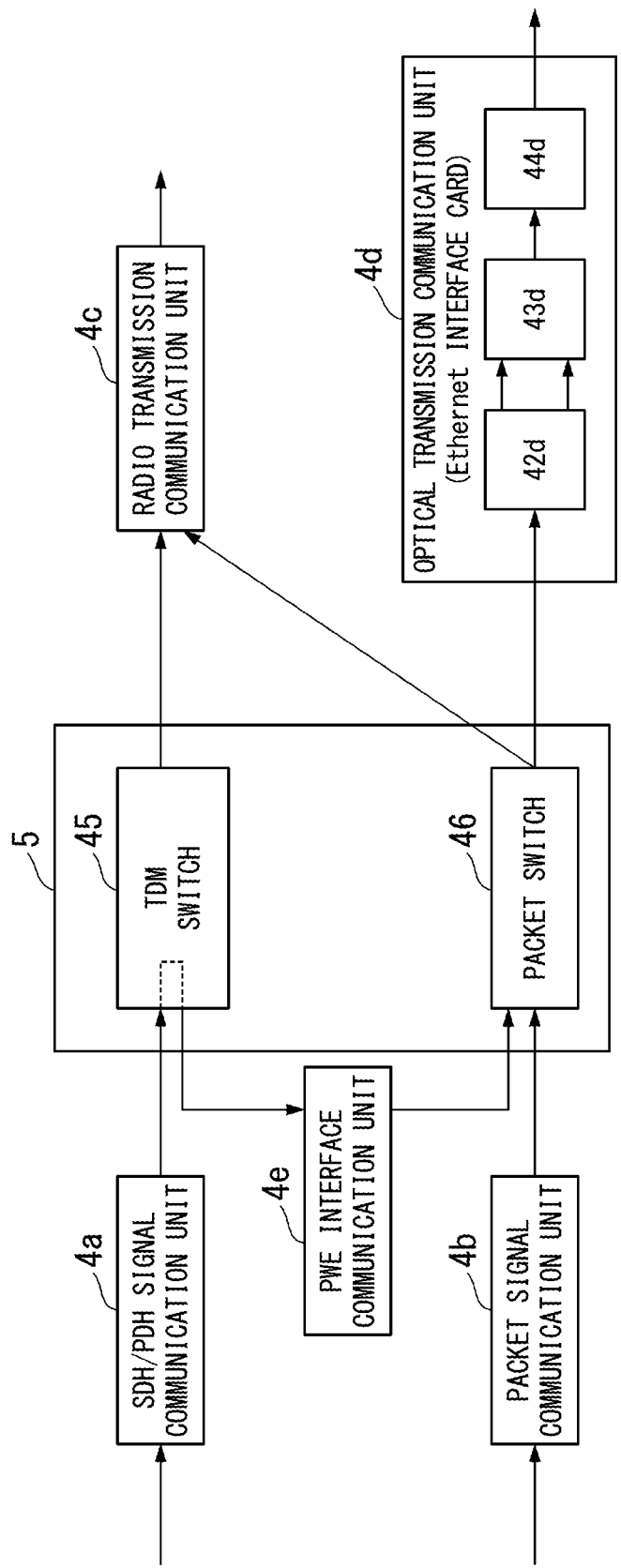
FIG. 7 is a fourth diagram that shows a main signal connection configuration between a control board and communication units.

FIG. 7 is a fourth diagram that shows a signal connection configuration between one control board and the communication units.

In the connection configuration between the control board and the communication units in FIG. 7, the PWE interface communication unit 4e (as one of the communication units 4) is separately inserted into a slot of the transmission apparatus 2 in addition to the configuration shown in FIG. 4.

In the present configuration, if it is determined due to the route allocation that the TDM switch 45 outputs a communication signal to the optical transmission communication unit 4d, then the TDM switch 45 outputs the relevant signal to the (external) PWE interface communication unit 4e.

Here, the PWE interface communication unit 4e is connected to the packet switch 46. Therefore, the PWE interface communication unit 4e converts the SDH/PDH signal into a packet signal, and outputs it to the packet switch 46 of the control board 5. The packet switch 46 then outputs the converted packet communication signal to the optical transmission communication unit 4d.

The connection configuration of FIG. 7 shows an example that an Ethernet (registered trademark) interface card is used as the optical transmission communication unit 4d as shown in FIG. 4.

According to the arrangement of FIG. 7, in the Ethernet (registered trademark) interface card, a signal received from the packet switch 46 is terminated by the packet terminal 42d. The multiprocessor 43d performs multiplex control for the communication signal, and the high-speed interface 44d outputs the relevant transmission frame to the optical communication processor that outputs the optical transmission signal.

If the transmission apparatus 2, in which a communication unit that converts an SDH/PDH signal to a packet signal by means of a Pseudo-Wire technique is inserted into a slot of the apparatus so that the control board only possesses a packet switch, employs the structure as shown in FIG. 6 or 7, then it is possible for the transmission apparatus 2 to convert the SDH/PDH signal into a radio signal or an optical transmission signal and to output the converted signal to an appropriate device.

On the other hand, if it is determined due to the route allocation that the TDM switch 45 outputs a communication signal to the radio transmission communication unit 4c, then the TDM switch 45 outputs the communication signal to the radio transmission communication unit 4c.

Accordingly, the TDM terminal 41c of the radio transmission communication unit 4c terminates the communication signal input from the TDM switch 45. The multiprocessor 43c performs multiplex control for the communication signal, and the radio frame converter 44c converts the multiplexed communication signal into a radio frame. The radio frame converter 44c outputs the radio frame to the radio communication processor that outputs the relevant radio signal as radio waves via the antenna.

Here, a multiplexed signal of an E1 signal (defined in a European hierarchy standard) and an Ethernet (registered trademark) signal, which are each input from an interface connected to a client and form a specific common frame, is transmitted through a transmission cable utilized for connecting the radio transmission communication unit 4c or the optical transmission communication unit 4d to the control board 5.

The control board 5 determines whether or not an error (failure) has occurred in a specific E1 channel (Ch) or a specific Ethernet signal, that is included in a radio signal or an optical transmission signal communicated between the radio transmission communication unit 4c or the optical transmission communication unit 4d and its communication partner.

The control board 5 switches the signal type of only (i) the E1 channel (Ch) including the error for the E1 signal or (ii) the frame including the error for the Ethernet signal (each signal being included in the radio signal or the optical transmission signal) from one (that occurred the error: e.g., the radio signal) of the radio signal and the optical transmission signal to the other (that is normal: e.g., the optical transmission signal) of the radio signal and the optical transmission signal.

If error has occurred in all signals multiplied in the radio signal or the optical transmission signal, the type of signal transmission is switched from the signal transmission which uses one (that occurred the error: e.g., the radio signal) of the radio signal and the optical transmission signal to the signal transmission which uses the other (e.g., the optical transmission signal).

According to such a redundant structure utilizing the radio transmission path and the optical transmission path, even when a failure in the radio transmission path due to a bad weather or a failure due to optical fiber breakdown caused by a serious disaster such as an earthquake has occurred, the failure can be recovered.

The present invention has been explained above. According to the above-described connection configuration between the control board and the communication units, a redundant structure is implemented for a line signal input from a client's device. Therefore, if an optical fiber or the like is broken off due to a change in the environment or a serious disaster, the signal output can be switched from that utilizing the optical transmission signal to that utilizing the radio signal so as to secure the transmission path. On the other hand, if the frequency band for radio transmission is restricted due to environmental degradation, such restriction can be compensated utilizing the optical transmission.

The above-described transmission apparatus includes a computer system. The above-described operations are each stored as a program in a computer-readable storage medium, and the operation is performed when the relevant computer loads and executes the program. The above computer readable storage medium is a magnetic disk, magneto optical disk, CD-ROM, DVD-ROM, semiconductor memory, or the like.

The program may execute a part of the above-explained functions.

In addition, the program may be one (so-called "differential program") by which the above-described functions can be executed by a combination of this program and an existing program which has already been stored in the relevant computer system.

INDUSTRIAL APPLICABILITY

In accordance with the present invention, for a transmission apparatus in which a communication unit that converts an SDH/PDH signal to a packet signal by means of a Pseudo-Wire technique is inserted into a slot of the apparatus so that the control board only possesses a packet switch, it is possible for the transmission apparatus to convert a signal for the SDH/PDH signal into a radio signal or an optical transmission signal and to output the converted signal to an appropriate device.

In addition, a redundant arrangement is applied to each input signal so that the output route can be appropriately chosen between one that utilizes a radio signal and one that utilizes an optical transmission signal. Therefore, a highly reliable transfer can be performed in the relevant communication even when a change in the environment or a serious disaster occurs.

REFERENCE SYMBOLS 2 transmission apparatus
3 package
4 communication unit
4a SDH/PDH signal communication unit
4b packet signal communication unit
4c radio transmission communication unit
4d optical transmission communication unit
5 control board
6 fan unit
7 power unit (power board)

8 external device connecting board
41c, 41d TDM terminal
42c, 42d packet terminal
43c, 43d multiprocessor
44c radio frame converter
44d high-speed interface

The invention claimed is:

1. A transmission apparatus comprising:
a package that has a plurality of slots into each of which a board can be freely detachably inserted;
at least one control board;
a PWE (Pseudo Wire Emulation) interface communication unit that is connected to the control board, converts an input SDH (Synchronous Digital Hierarchy) or PDH (Pre Synchronous Digital Hierarchy) signal to a packet signal, and outputs the converted signal to the control board;
a radio transmission communication unit that is connected to the control board, converts the packet signal to a radio signal, and outputs the converted signal; and
an optical transmission communication unit that is connected to the control board, converts the packet signal to an optical transmission signal, and outputs the converted signal,
wherein the units are separately inserted in the slots.

2. The transmission apparatus in accordance with claim 1, further comprising:
an SDH/PDH signal communication unit that is further separately inserted in the slots so as to be connected to the control board and outputs the input SDH or PDH signal to the control board,
wherein the PWE interface communication unit receives the SDH or PDH signal output via the SDH/PDH signal communication unit and the control board, converts the received signal to the packet signal, and outputs the converted signal.

3. The transmission apparatus in accordance with claim 2, wherein:
the control board comprises a device that outputs the SDH or PDH signal, which is received from the SDH/PDH signal communication unit, to the radio transmission communication unit by means of route allocation; and the
the radio transmission communication unit converts the received SDH or PDH signal to a radio signal, and outputs the radio signal.

4. The transmission apparatus in accordance with claim 2, wherein:
the control board outputs the packet signal to one of the radio transmission communication unit and the optical transmission communication unit, which is predetermined, or determined, based on information obtained from an external apparatus, to be used in a communication process.

5. The transmission apparatus in accordance with claim 1, wherein:
the PWE interface communication unit converts the SDH or PDH signal to the packet signal by a Pseudo-Wire technique.

6. The transmission apparatus in accordance with claim 1, wherein:
the control board outputs the packet signal to one of the radio transmission communication unit and the optical transmission communication unit, which is predetermined, or determined, based on information obtained from an external apparatus, to be used in a communication process.

7. A processing method of a transmission apparatus which includes a package that has a plurality of slots into each of which a board can be freely detachably inserted; and at least one control board, where a PWE interface communication unit, a radio transmission communication unit, and an optical transmission communication unit are each connected to the control board and are separately inserted in the slots, wherein in the method:
the PWE interface communication unit converts an input SDH or PDH signal to a packet signal, and outputs the converted signal to the control board;
the radio transmission communication unit converts the packet signal to a radio signal, and outputs the converted signal; and
the optical transmission communication unit converts the packet signal to an optical transmission signal, and outputs the converted signal.

8. The processing method in accordance with claim 7, wherein:
an SDH/PDH signal communication unit that is further separately inserted in the slots so as to be connected to the control board and outputs the input SDH or PDH signal to the control board; and
the PWE interface communication unit receives the SDH or PDH signal output via the SDH/PDH signal communication unit and the control board, converts the received signal to the packet signal, and outputs the converted signal.

* * * * *